United States Patent
Eberle et al.

[11] Patent Number: 4,738,576
[45] Date of Patent: Apr. 19, 1988

[54] ROBOT JOINT

[75] Inventors: Manfred Eberle; Robert Kleemann, both of Erlangen, Fed. Rep. of Germany

[73] Assignee: Mantec Gesellschaft für Automatisierungs-und Handhabungssysteme mbH, Fürth, Fed. Rep. of Germany

[21] Appl. No.: 848,336

[22] Filed: Apr. 3, 1986

Related U.S. Application Data

[63] Continuation of Ser. No. 593,854, Mar. 27, 1984, abandoned.

[30] Foreign Application Priority Data

Apr. 6, 1983 [DE] Fed. Rep. of Germany ....... 3312377

[51] Int. Cl.$^4$ ................................................ B25J 9/00
[52] U.S. Cl. ......................................... 414/4; 414/751; 901/23; 901/25; 901/28
[58] Field of Search ............................. 901/23, 25, 28; 414/749, 751, 4; 384/455, 563

[56] References Cited

U.S. PATENT DOCUMENTS

| | | | |
|---|---|---|---|
| 2,594,578 | 4/1952 | McNicoll | 384/455 X |
| 3,686,986 | 8/1972 | Ledergerber et al. | 384/563 X |
| 4,046,262 | 9/1977 | Vykokal et al. | 901/28 X |
| 4,096,766 | 6/1978 | Pardo et al. | 901/28 X |
| 4,300,198 | 11/1981 | Davini | 901/28 X |
| 4,343,055 | 8/1982 | Bergling | 384/455 X |

FOREIGN PATENT DOCUMENTS

| | | |
|---|---|---|
| 22332 | 1/1981 | European Pat. Off. . |
| 48905 | 4/1982 | European Pat. Off. . |
| 65859 | 12/1982 | European Pat. Off. ............... 25 X/ |
| 1148721 | 5/1963 | Fed. Rep. of Germany . |
| 2526504 | 7/1979 | Fed. Rep. of Germany . |

Primary Examiner—L. J. Paperner
Assistant Examiner—D. Glenn Dayoan
Attorney, Agent, or Firm—Kenyon & Kenyon

[57] ABSTRACT

A robot joint includes an electric drive motor and step-down transmission built into the robot joint housing. The output of the transmission drives a gear to which a mounting flange is coupled. A first part of the robot is coupled to the housing and a second robot part is coupled to the mounting flange. The mounting flange is supported axially and radially in the housing by bearings. The bearings preferably include a conical-roller bearing for providing radial and axial support and a needle bearing for providing axial support. Both bearings are maintained under pretension by a spring, thereby providing a robot joint which is free of play.

5 Claims, 5 Drawing Sheets

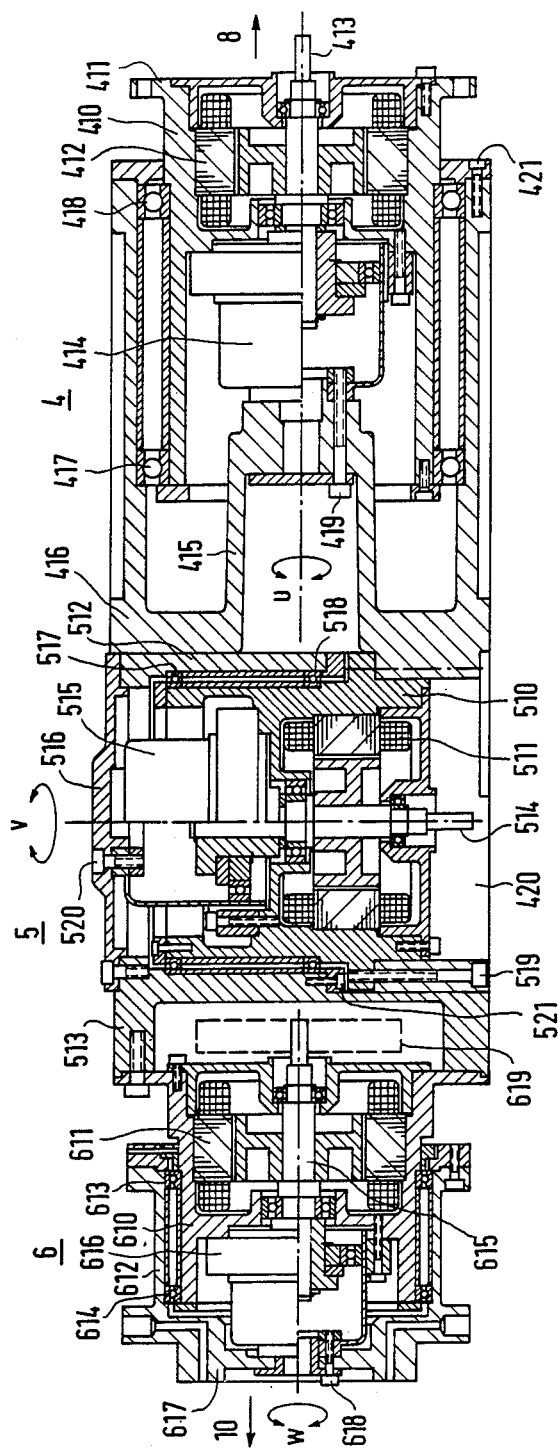

ROBOT JOINT

This application is a continuation of application Ser. No. 593,854, filed Mar. 27, 1984, now abandoned.

BACKGROUND OF THE INVENTION

The present invention relates to the field of robots, and particularly to a robot joint having an electric drive motor and a step-down transmission built integrally into the joint housing.

Jointed robots and robot joints are known in varied designs. See, for instance, German AS No. 25 26 504, German AS No. 11 48 721 and European Patent Applications Nos. 22 332 and 48 905. In these arrangements, the motors and transmissions are in part also built into the joints.

Industrial robots preferably should meet the following requirements:

It should be possible to construct them in modular fashion, i.e., in the form of a building block system. Furthermore, robots should require relatively little space and exhibit both ease of installation and maintenance. At the same time, robots should combine high travel velocity with high positioning accuracy.

Repeatability of the positioning processes with high accuracy in a modular system requires that the individual joints, particularly those at the start of the robot arm, i.e., those farthest from the workpiece, should have as little play as possible. In robot designs where the saving of space is a prime requirement, it has generally proven difficult to at the same time achieve joint designs having little play.

SUMMARY OF THE INVENTION

It is an object of the present invention to provide a modular robot joint for a robot which is space-saving in design but yet which also permits high accuracy, even after extended operation.

It is also an object of the present invention to provide a robot joint having substantially no free play in the joint mechanism.

These and other objects of the present invention are achieved by a robot joint for coupling a first robot part to a second robot part comprising housing means coupled to the first robot part, drive motor means disposed in the housing means, step-down transmission means coupled to the drive motor means and disposed in the housing means, the step-down transmission having output gear means, second gear means engaging the output gear means, mounting flange means coaxially coupled to the second gear means, the mounting flange means adapted to be coupled to the second robot part, bearing means for axially and radially guiding the mounting flange means in the housing means and spring means for maintaining the bearing means under tension.

In an advantageous embodiment of the invention, the bearing means comprises an axial bearing disposed between the housing means and a circular shoulder of the mounting flange means and a conical-roller bearing disposed between the mounting flange means and the housing means.

The drive motor means preferably comprises a permanently excited three phase motor means which carries on the side facing away from the transmission means a travel distance pick-up means for controlling the position and velocity of the robot arm.

The above-described features provide a robot joint which is suitable for use in a robot of modular design and which also ensures high positioning accuracy.

BRIEF DESCRIPTION OF THE DRAWINGS

The invention will be described in greater detail, in the following detailed description, with reference to the drawings, in which:

FIG. 6 is a longitudinal sectional view through three assembled joints disposed between the forearm and the gripping mechanism of the robot.

DETAILED DESCRIPTION

Figure 1:
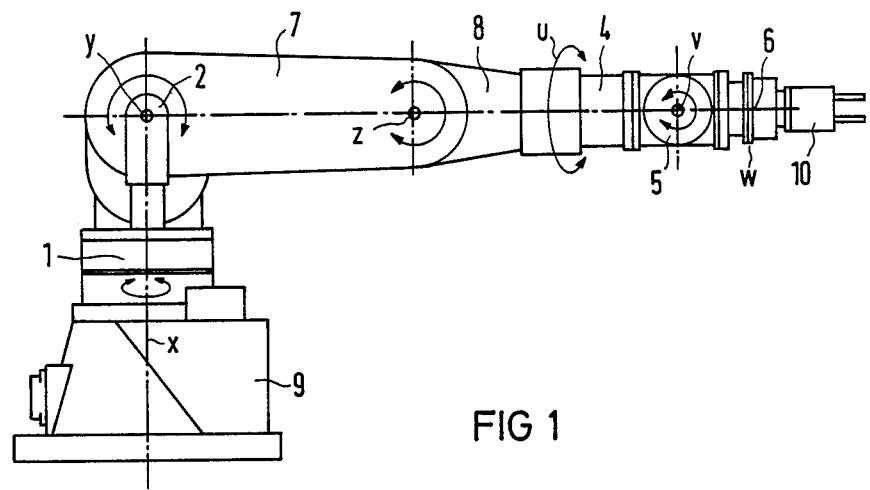
FIG. 1 is a side view of an industrial jointed robot showing the various robot joints and their axes of rotation.
Figure 2:
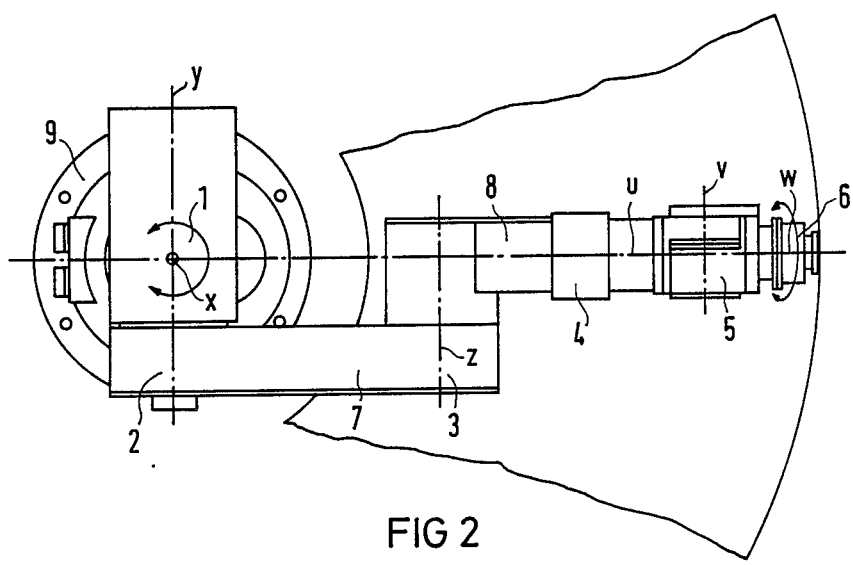
FIG. 2 is a top view of the robot shown in FIG. 1.

With reference now to the drawings, in the industrial jointed robot shown schematically in FIGS. 1 and 2, the joint 1, also known as a rump joint, is mounted on a pedestal or base 9. This joint allows rotation about the x-axis in a range of, for instance, 400°. In the drawing figures, the various axes of rotation are indicated by the letters, x, y, z, u, v and w, and appropriate lines or circular arrows. A second joint 2 is coupled to joint 1 through which rotation about the y-axis, arranged perpendicularly to the x-axis, is possible, in a range of, for instance, 250°. Joint 2 is also known as a shoulder joint.

The upper arm 7 is laterally fastened to joint 2. The upper arm 7 carries at its other end a joint 3, through which a rotation of, for instance, 320° about the z-axis is possible. The z-axis is arranged perpendicularly to the longitudinal direction of the arm. The z-axis and the y-axis are parallel to each other, as shown.

The lower arm or forearm 8 is fastened to joint 3 and is guided parallel to the upper arm 7. Three joints 4, 5, 6 are coupled to the lower arm 8. These joints allow rotation of 300°, 180° and 540° about the axes of rotation, u, v and w, respectively.

The gripper mechanism or hand 10 is fastened to joint 6.

As shown, the axes x, u and w lie in the same plane while the axes y, z and v are parallel to each other.

Figure 3:
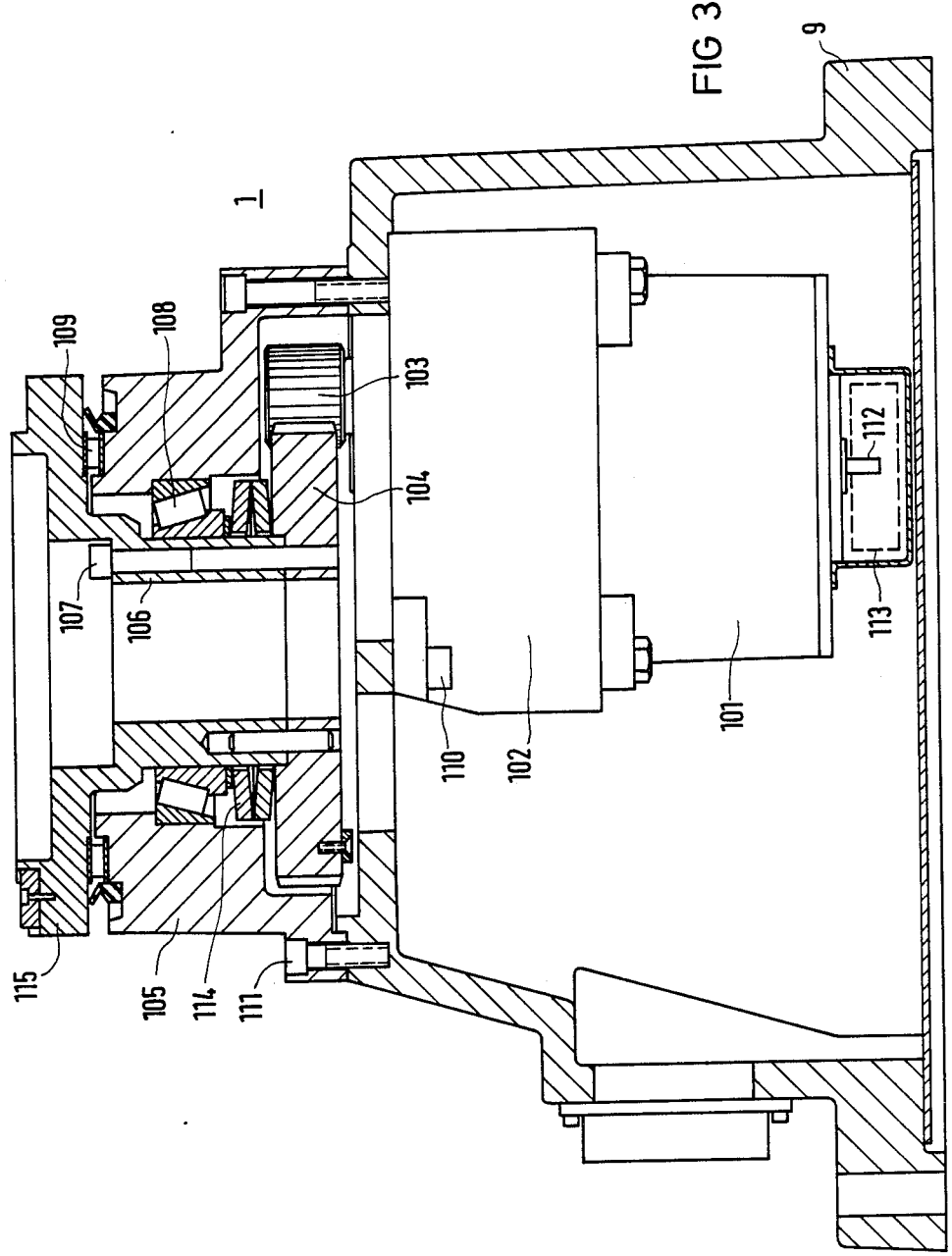
FIGS. 3 and 4 are longitudinal sectional views through joints of the robot shown in FIGS. 1 and 2 between the pedestal and the upper arm.

FIG. 3 is a sectional view through the joint 1 mounted on pedestal 9. An electric drive motor 101 is coupled to a reduction gear transmission 102 which is arranged in the interior of the pedestal 9 and is bolted to the pedestal by means of bolts 110. At one end of shaft 112 of motor 101 a travel distance pickup device 113 is disposed, indicated by the dashed lines. The drive motor 101 is preferably a three-phase motor having permanent magnet excitation and a relatively low moment of inertia.

The output pinion 103 of transmission 102 meshes with a gear 104. Gear 104 is mechanically coupled to a coaxial mounting flange 106 by bolts 107. The mounting flange 106 is designed as a screw-machine part. Gear 104 and flange 106 are guided axially and radially in a bearing housing 105, which forms part of the joint housing, and specifically, axially via a needle bearing 109 and axially and radially via a conical-roller bearing 108. The bearings 108 and 109 are maintained under pretension by a spring 114. Pretension is supplied directly to bearing 108 by the spring 114 and to bearing 109 by way of gear 104 and mounting flange 106. In conjunction with the use of conical-roller bearing 108, since mounting flange 106 is guided in the bearing housing 105 by needle bearing 109 forming a ring of nearly the joint diameter, a large amount of freedom from play can be achieved.

Once the screw connections 111 are loosened, bearing housing 105 and the parts connected thereto can be removed from the pedestal 9.

Figure 4:
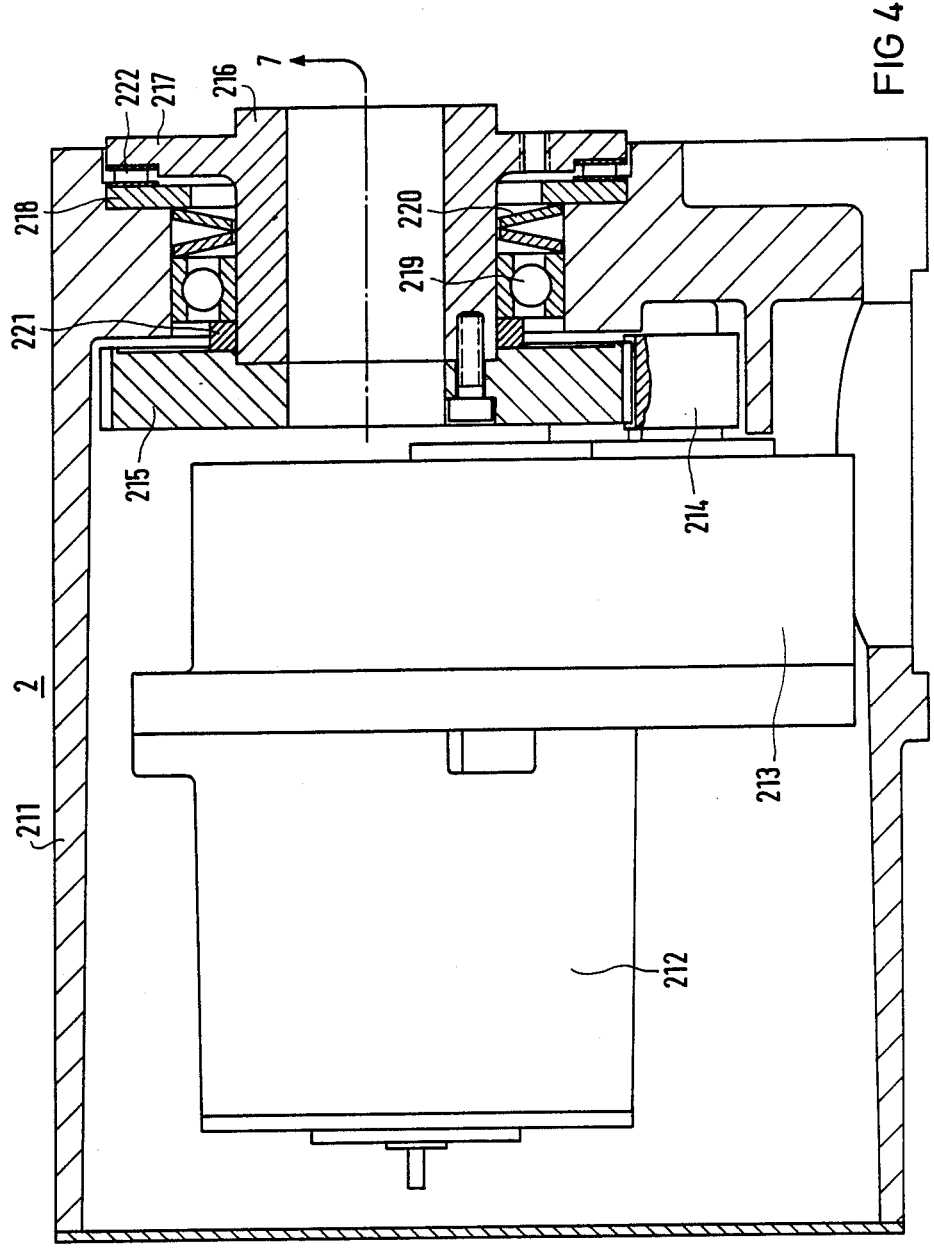

Mounting flange 106 of joint 1 can be bolted at its shoulder 115 to joint 2 shown in FIG. 4, and specifically to the tubular housing 211 of joint 2.

Joint 2 includes an electric drive motor 212 built into the joint housing 211 which drives a step-down transmission 213. At the output of transmission 213, a pinion 214 is provided which meshes with gear 215. Gear 215 is bolted to a coaxial flange 216. The ring shoulder 217 of flange 216 is axially guided by a needle bearing 222 and biased against a pressure ring 218 which is bolted to the joint housing 211. In order to provide for radial guidance of the flange 216, a ball bearing 219 under pretension by a spring 220 which is braced against a pressure ring 218 is provided. Bearing 222 is also under pretension via a ring 221, gear 215 and flange 216, so that a taut play-free joint is provided.

Figure 5:
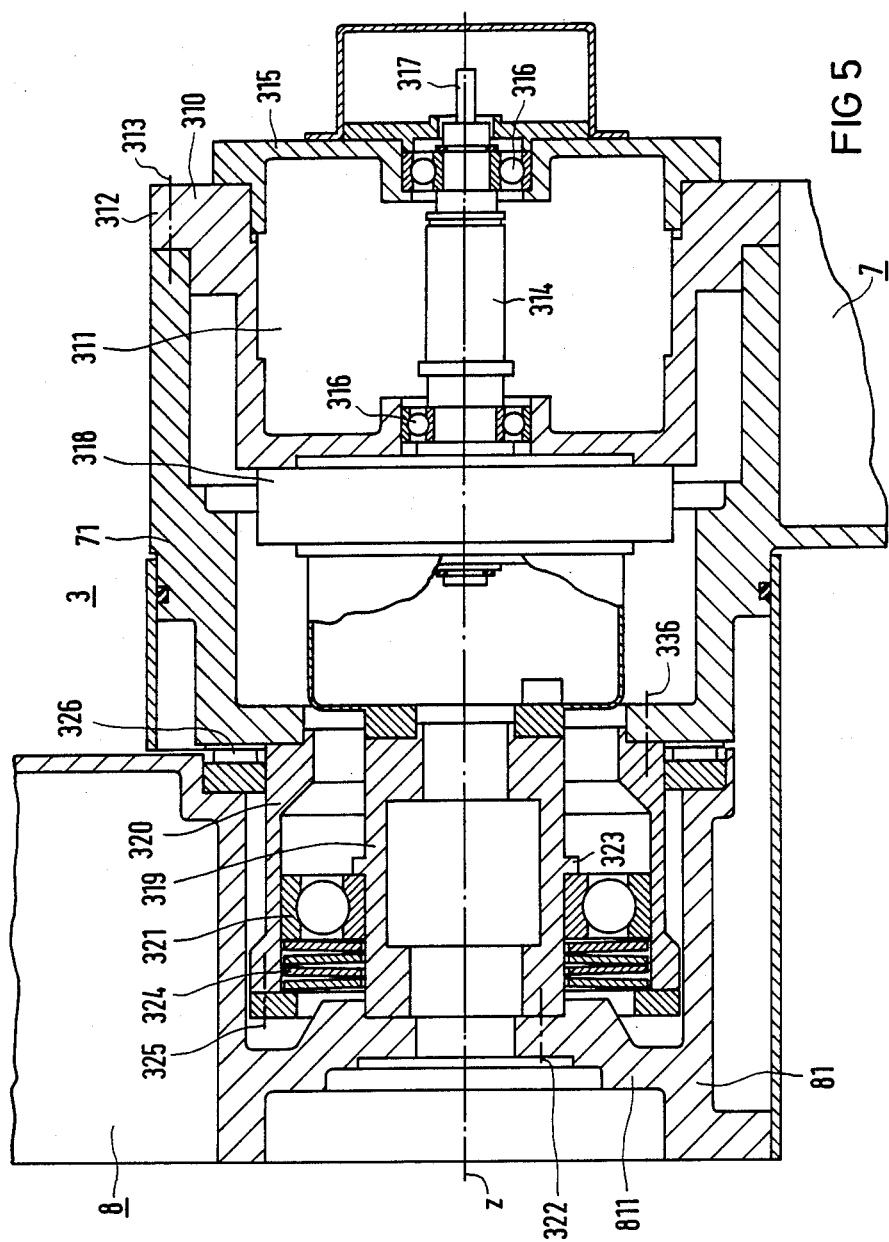
FIG. 5 is a sectional view through the joint between the upper arm and the forearm or lower arm of the robot.

FIG. 5 is a sectional view of the joint 3 between the upper arm 7 and the lower arm or forearm 8 and which provides for rotation about the z-axis shown. The joint housing is substantially formed by two adjoining tubular end sections 71 and 81 of upper arm 7 and lower arm 8, respectively.

In end section 71, a housing 310 for an electric drive motor 311 is provided. The circular shoulder 312 of housing 310 is inserted so that it butts against part 71. Housing 310 is coupled to part 71 via screw connections 313 as indicated.

Shaft 314 of motor 311 is guided by ball bearings 316, one of which is arranged in housing 310 and the other of which is arranged in a bearing cover 315. Shaft 314 is provided at one end 317 with receiving threads for travel distance and speed pickups, not shown. At the other end of shaft 314, a step-down transmission or harmonic drive 318 is coupled thereto and coaxially disposed. A cylindrical driver 319 which lies in the longitudinal axis of shaft 314 is bolted to step-down transmission 318. Tubular part 81 coaxially surrounds driver 319. Driver 319 is further supported by a coaxial support tube 320 coupled to part 71 by a ball bearing 321 located approximately centrally in the lower arm 8. Ball bearing 321 rests against a circular shoulder 323 of the driver 319 and is under pretension provided by a compression spring 324 which is braced against a pressure ring 325 bolted to support tube 320. The end of driver 319 is coupled to a coupler part or flange 811 of the end part 81 of the lower arm 8 via indicated screw connections 322.

Additionally, the lower arm 8 is further guided by an axial bearing 326 which is arranged between adjoining ring surfaces of parts 71 and 81 and which is likewise under the compensating pretension of spring 324.

Once screw connections 322 are loosened, the lower arm 8 can be detached from joint 3.

The motor 312, transmission 318 and driver 319 can be pulled out of tubular part 71 after the screw connections 313, indicated by dashed lines, have been loosened.

FIG. 6 is a longitudinal sectional view of the three assembled joints 4, 5 and 6 disposed betwen the lower arm 8 and the gripper 10, by means of which rotation about the respective axes u, v and w is possible.

As shown, joint 4 comprises a tubular inner part 410 which is bolted to the lower arm 8 via a flange 411. The inner part 410 is designed as a screw machine part and also forms the housing for an electric drive motor 412. Motor 412 is preferably a three-phase motor having permanent magnet excitation and a low moment of inertia. Motor 412 is preferably disposed near joint 3, so that the mass of the motor creates a minimal bending stress.

The shaft 413 of motor 412 drives a coaxially disposed step-down transmission or harmonic drive 414 fastened to inner part 410. The output of the transmission is bolted to a flange 415 of a tubular outer part 416, which is also designed as a screw machine part and which surrounds the inner part 410 coaxially. Outer part 416 is guided by two spaced ball bearings 417 and 418 disposed on the inner part 410. The distance between the two ball bearings 417 and 418 is chosen so that maximum moments can be accommodated.

After the indicated screw connections 419 and 421 are loosened, the inner part 410 including motor 412 and transmission 414 can be pulled out of the outer part 416.

Outer part 416 has an added support part 420 which supports joint 5 and to which joint 5 is mounted.

Joint 5 likewise includes a tubular inner part 510 which is bolted to the lateral support part 420. Part 510 also forms the housing for electric drive motor 511. A tubular outer part 512 coaxially surrounds the inner part 510. Tubular support part 512 has, on one side, extensions 513 to which joint 6 is mounted. The motor shaft 514 is coupled to a step-down transmission 515. The output of transmission 515 is coupled to a bearing cover 516 via bolts 520 and thence to outer part 512, as shown.

Inner tubular part 510 and outer tubular part 512 are supported against each other by ball bearings 517 and 518. After loosening the indicated screw connections 519, joint 5 can be disassembled from of joint 4.

After the screw connections 520 and 521 are loosened, the inner part 510 together with motor 511 and transmission 515 can be pulled out of the outer part 512.

The joint 6 comprises a tubular inner part 610 which can be bolted to the mounting support extension 513 of joint 5. Part 610 also forms the housing for an electric drive motor 611. A tubular outer part 612 coaxially surrounds inner part 610 and is supported against the inner part by spaced apart ball bearings 613 and 614. The motor shaft 615 is coupled to coaxially mounted step-down transmission 616, the output of which is coupled to a coupling flange 617 of outer part 612 by bolts 618. Once joint 6 is disassembled from the rest of the robot arm by removing the bolts coupling it to part 513, and after the screw connections 618 are loosened, the inner part 610 with the motor and transmission can be pulled out of the outer part 612.

As indicated by the broken lines, a travel distance pick-up 619 may be arranged on the side of the motor shaft 615 facing away from transmission 616, the same as all of the other joints.

The design described above is distinguished by its space-saving construction, ease of maintenance and high positioning accuracy.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A robot joint for coupling a first robot part to a second robot part comprising:
    housing means coupled to the first robot part;
    drive motor means disposed in the housing means;
    step-down transmission means coupled to said drive motor means and disposed in said housing means, said step-down transmission means having output gear means;
    second gear means meshing with said output gear means;
    mounting flange means coaxially coupled to said second gear means, said mounting flange means adapted to be coupled to the second robot part;
    first bearing means for axially guiding said mounting flange means in said housing means,
    second bearing means for radially guiding said mounting flange means in said housing means;
    spring means arranged coaxially with said first and second bearing means in a plane parallel to said first and second bearing means for maintaining said first and second bearing means under tension and said mounting flange means further comprising ring shoulder means radially extending outwardly from said mounting flange means and said first bearing means is disposed between said housing means and said ring shoulder means of said mounting flange means.

2. The robot joint recited in claim 1, wherein said bearing means comprises conical-roller bearing means disposed between said mounting flange means and said housing means.

3. The robot joint recited in claim 1, wherein said bearing means comprises ball bearing means disposed between said mounting flange means and said housing means.

4. The robot joint recited in claim 1, wherein said drive motor means comprises three-phase motor means and further including travel distance pick-up means disposed on a side of said motor means facing away from said transmission means.

5. The robot joint recited in claim 1, wherein said housing means includes main housing means and secondary housing means coupled thereto, said motor means and transmission means coupled to said main housing means by first screw means, said secondary housing means coupled to said main housing means by second screw means, said second gear means disposed in said secondary housing means, said second bearing means being retained by said secondary housing means.

* * * * *